F. NUGENT.
MINING MACHINE CHUCK.
APPLICATION FILED SEPT. 23, 1913.
1,109,865.
Patented Sept. 8, 1914.
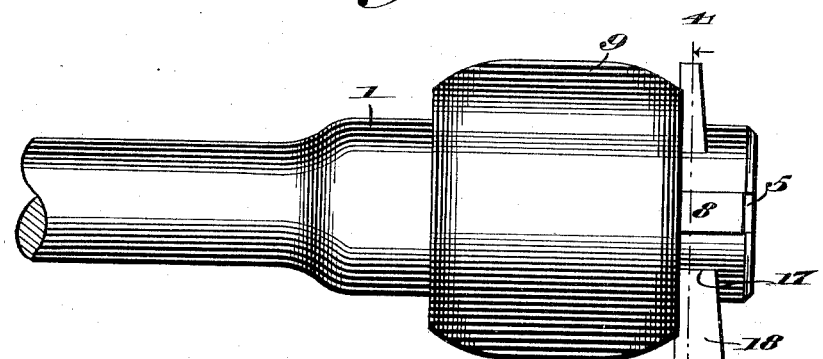
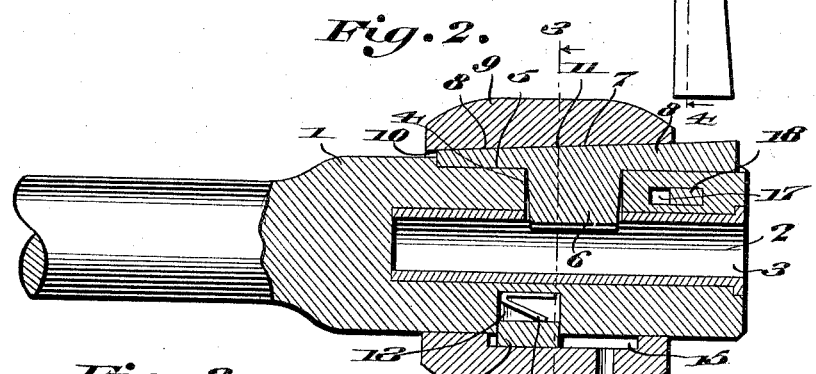
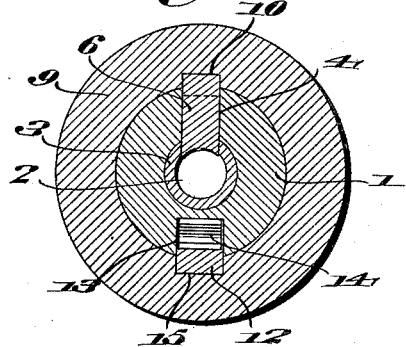
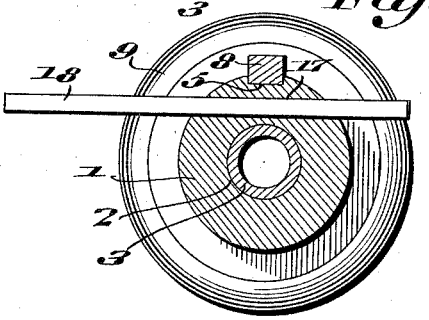
Inventor
Frederick Nugent
By Victor J. Evans
Attorney
Witnesses
M. H. Slifer
John J. McCarthy

UNITED STATES PATENT OFFICE.

FREDERICK NUGENT, OF MACE, IDAHO, ASSIGNOR OF ONE-HALF TO LEVI R. NUGENT, OF MISSOULA, MONTANA.

MINING-MACHINE CHUCK.

1,109,865.  Specification of Letters Patent.  Patented Sept. 8, 1914.

Application filed September 23, 1913. Serial No. 791,381.

*To all whom it may concern:*

Be it known that I, FREDERICK NUGENT, a citizen of the United States, residing at Mace, in the county of Shoshone and State of Idaho, have invented new and useful Improvements in Mining-Machine Chucks, of which the following is a specification.

This invention relates to improvements in drill chucks, and has particular application to what are known as self-tightening chucks.

In carrying out my invention it is my intention to provide a self-tightening drill chuck which will embody among other features a tool holder and a keying ring surrounding the tool holder and capable of sliding movement thereon so that the tool may be secured within the holder or socket and removed therefrom, a spring-pressed dog being interposed between the chuck body or tool holder and the ring and acting to limit the movement of the latter to releasing position thereby preventing the accidental removal of the ring from the chuck body.

It is also my purpose to provide a chuck of the class described which will embrace the desired features of simplicity, efficiency and durability, one which may be manufactured and marketed at a minimum expense and one which may be quickly and conveniently manipulated to clamp and release the drill steel.

With the above and other objects in view, the invention consists in the construction, combination and arrangement of parts hereinafter set forth in and falling within the scope of the claims.

In the accompanying drawings:—Figure 1 is a view in side elevation of a self tightening drill chuck constructed in accordance with my present invention; Fig. 2 is a longitudinal sectional view through the same; Fig. 3 is a cross sectional view therethrough on the line 3—3 of Fig. 2; and Fig. 4 is a similar view on the line 4—4 of Fig. 1.

Referring now to the accompanying drawings in detail, the numeral 1 designates the chuck body having the tool socket 2 formed therein and opening onto the outer end thereof and lined with a bushing 3 of some suitable material. Formed in the chuck body is a radial slot 4 communicating with the tool socket 2 and opening onto the outer surface of the body. In the present instance a longitudinal groove 5 is formed in the outer surface of the body and intersects the radial slot. Passed through the slot 4 is a key 6 having the inner end thereof curved cross sectionally to conform to the contour of the socket and adapted to bind against the adjacent portion of the steel or tool, while the outer edge thereof is inclined from the forward end of the body toward the rear, as at 7. In this instance, the key 6 at the upper longitudinal edge thereof is formed with laterally projecting wings 8—8 having the under edges thereof designed to seat within the longitudinal groove 5 and the upper edges inclined to correspond with the inclined edge of the key.

The numeral 9 designates what may be termed a keying ring surrounding the chuck body and capable of sliding movement thereon and having the inner wall thereof formed with a longitudinal groove 10 provided with an inclined lower wall 11 corresponding to the inclined edge 7 of the key and adapted to engage such edge, in the sliding of the ring to clamping position, to force the key into the slot and so as to maintain the tool or steel within the socket, a wedging action being set up between the inclined wall 11 of the groove 10 and the similar wall or edge of the key 6.

In order to limit the sliding movement of the keying ring to releasing position, I employ a dog 12 mounted within a radial slot 13 formed in the chuck body 1 at a point diametrically opposite the slot 4, a spring 14 being interposed between the lower wall of the slot 13 and the confronting edge of the dog 12 acting upon the dog to force the latter outwardly of the slot. This dog plays within a groove 15 formed in the inner surface of the ring 9 at a point diametrically opposite the wedging groove, the groove 15 having the opposite ends thereof closed so that accidental removal of the keying ring from the chuck body is avoided incident to contact with the end walls of the groove 15. When it is desired to remove the keying ring from the chuck body the keying ring is moved to releasing position until arrested by the dog 12 at which time a suitable pin is passed through an aperture 16 in the ring 9 contiguous the groove 15, such pin engaging the dog 12 to force the latter to releasing position against the action of the spring 14, thus the keying ring may be removed from the chuck body.

In some instances, the wedging action set up between the inclined wall 11 of the wedging groove and the similar edge of the wedging key may be such that the keying ring will not readily slide to releasing position, and in order that the ring may be conveniently manipulated under such circumstances I form a transverse wedge-shaped slot 17 in the body 1 immediately adjacent to the outer end thereof, such slot receiving the wedge-shaped key 18, which when forced through the slot under pressure acts upon the adjacent edge of the keying ring to slide the latter along the chuck body to releasing position.

From the foregoing description, taken in connection with the accompanying drawings, the construction, mode of operation and manner of employing my invention will be readily apparent. It will be seen that I have provided a drill chuck wherein the keying ring is at all times held upon the chuck body and may be removed therefrom when desired, while the parts of the chuck are so correlated and arranged that the possibility of derangement is reduced to a minimum.

Having thus described my invention, what I claim is:—

1. In a self tightening drill chuck, a chuck body having a tool socket therein and formed with a radial slot opening onto the outer surface thereof, a key within said slot, a ring surrounding said chuck body adapted to force said key into engagement with the tool, and a spring-pressed dog acting upon said ring to limit the movement thereof to releasing position.

2. In a self tightening drill chuck, a chuck body having a tool socket therein formed with a radial slot opening onto the outer surface thereof, a key within said slot, a ring surrounding said chuck body and adapted to force said key into engagement with the tool, and means for sliding said ring to releasing position in the event of undue binding between the parts.

3. In a self tightening drill chuck, a chuck body having a tool socket therein formed with a radial slot opening onto the outer surface thereof, a key within said slot, a ring surrounding said chuck body and adapted to force said key into engagement with the tool, and a wedge-shaped key adapted to slide said ring to releasing position in the event of undue binding between the parts.

4. In a self tightening drill chuck, a chuck body having a tool socket therein and formed with a radial slot opening onto the outer surface thereof, a key within said slot, a ring surrounding said chuck body and adapted to force said key into engagement with the tool, and a spring pressed dog carried by said chuck body and engaging the inner wall of said ring to limit the movement thereof to releasing position.

5. In a self tightening drill chuck, a chuck body having a tool socket therein and formed with a radial slot opening onto the outer surface thereof, a key within said slot, a ring surrounding said chuck body and adapted to force said key into engagement with the tool, and a spring pressed dog carried by said chuck body and engaging the inner wall of said ring to limit the movement thereof to releasing position, said ring being provided with means whereby an instrument may be inserted to relieve said ring of the influence of said dog.

6. In a self tightening drill chuck, a chuck body having a tool socket therein and formed with a radial slot opening onto the outer surface thereof, a key within said slot, a ring surrounding said chuck body and adapted to force said key into engagement with the tool, a spring pressed dog carried by said chuck body and engaging the inner wall of said ring to limit the movement thereof to releasing position, and a wedge-shaped key operable to slide said ring to releasing position in the event of undue binding between the parts.

In testimony whereof I affix my signature in presence of two witnesses.

FREDERICK NUGENT.

Witnesses:
JOHN H. TOLAN,
LEVI R. NUGENT.

---

Copies of this patent may be obtained for five cents each, by addressing the "Commissioner of Patents, Washington, D. C."